(12) United States Patent
Che et al.

(10) Patent No.: US 7,920,724 B2
(45) Date of Patent: Apr. 5, 2011

(54) IRIS RECOGNITION METHOD UTILIZING MATCHING PURSUIT ALGORITHM

(75) Inventors: Wen-Gang Che, Taipei (TW);
Jian-Liang Lin, Su-ao Township, Yilan County (TW); Wen-Liang Hwang, Taipei (TW); Chung-Ling Huang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 933 days.

(21) Appl. No.: 11/603,031

(22) Filed: Nov. 22, 2006

(65) Prior Publication Data
US 2008/0095411 A1    Apr. 24, 2008

(30) Foreign Application Priority Data

Sep. 29, 2006  (TW) .............................. 95136346 A

(51) Int. Cl.
*G06K 9/00*    (2006.01)
(52) U.S. Cl. ...................................................... 382/117
(58) Field of Classification Search .................. 382/117
See application file for complete search history.

(56) References Cited

U.S. PATENT DOCUMENTS

| | | | | |
|---|---|---|---|---|
| 4,641,349 A * | 2/1987 | Flom et al. | ..................... | 382/117 |
| 5,291,560 A * | 3/1994 | Daugman | ..................... | 382/117 |
| 6,614,919 B1 * | 9/2003 | Suzaki et al. | .................. | 382/117 |
| 2003/0076984 A1 * | 4/2003 | Tisse et al. | ..................... | 382/117 |
| 2006/0147094 A1 | 7/2006 | Yoo | | |
| 2006/0165266 A1 | 7/2006 | Hamza | | |

* cited by examiner

*Primary Examiner* — David P Rashid
(74) *Attorney, Agent, or Firm* — Rosenberg, Klein & Lee

(57) ABSTRACT

The present invention disclose an iris recognition method, which utilizes a matching pursuit algorithm to simplify the extraction and reconstruction of iris features and reduce the memory space required by each iris feature vector without the penalty of recognition accuracy. The iris recognition method of the present invention comprises an iris-localization component and a pattern matching component. The iris-localization component locates the iris region via the color difference between different portions of the eyeball. The primary iris features are extracted from iris information and transformed into a sequence of iris feature vectors by a matching pursuit algorithm. Thus, the iris image can be represented by a sequence of atoms, and each atom contains base, amplitude and location. Then, the comparison between the feature vectors of two irises is performed to determine whether the two irises match.

10 Claims, 3 Drawing Sheets

Enhanced Iris Images

IRIS RECOGNITION METHOD UTILIZING MATCHING PURSUIT ALGORITHM

BACKGROUND OF THE INVENTION

1. Field of the Invention

The present invention relates to an iris recognition method, particularly to an iris recognition method, which utilizes a matching pursuit algorithm to simplify the extraction and reconstruction of iris features to reduce the memory space required by each piece of iris feature vector without the penalty of reducing recognition accuracy.

2. Description of the Related Art

Traditionally, people use the token-based mechanism or the knowledge-based mechanism to perform personal identification. In the token-based mechanism, the user uses a physical identification tool he owns to verify his identity, such as a stamp, an ID card, a passport, a credit card or a key. In the knowledge-based mechanism, the user uses the knowledge he owns to verify his identity, such as a password, the ID number, a telephone number or his birthday. As the two traditional identification mechanisms do not use the intrinsic features, the users are apt to meet some inconveniences; for example, the identification tool is lost, stolen, or imitated; the password is forgotten, incorrectly remembered, or deciphered. When the abovementioned cases happen, the traditional identification mechanisms cannot determine whether the person who owns the identification tool or the password is the authentic user. Thus, the traditional identification mechanisms cannot always guarantee the security function. In contrast with the abovementioned traditional identification mechanisms, the biometric technology has a much superior reliability and becomes the developing tendency in the field concerned. The biometric technology is defined as "automated methods of verifying or recognizing the identity of the user based on his intrinsic features, such as his eyeball, face, fingerprint and voice".

A good biometric identification mechanism should have the following characteristics: (1) generality, i.e. the adopted biometric feature generally exists in all persons; (2) uniqueness, i.e. two persons cannot possess all the same adopted biometric feature; (3) invariability, i.e. the adopted biometric feature is invariable eternally; and (4) measurability, i.e. the adopted biometric feature can be measured and quantified. The abovementioned conditions should be considered in adopting an appropriate biometric feature. Further, in designing a practical biometric identification mechanism, the following factors also should be considered: (1) performance, i.e. the recognition speed and reliability; (2) acceptability, i.e. users are willing or glad to accept the mechanism; and (3) inescapability, i.e. the mechanism is unlikely to be fooled or cheated, and all the non-authenticated persons cannot escape from the detection of the mechanism. Based on the abovementioned conditions and factors, several biometric identification systems have been extensively used or under trial and estimation, including: face shape, face thermal sensation, fingerprint, palmprint, retina, iris and voice identification systems.

So far, the iris identification system has the highest discrimination rate among the biometric identification systems. Further, the complexity and diverseness of the iris makes the iris identification systems very hard to break through. The iris is an annular region between the sclera and the pupil. The iris texture is complicated enough to be used as a biometric signature. For ordinary people, their irises have completely developed at about two years old, and their iris patterns are also fixed then. In the iris identification technology, the iris image is scanned and transformed into digital codes, and an algorithm is used to extract the discriminable feature vectors from the digital codes; then, the feature vectors are stored in a database. In the personal identification, the identity is verified or recognized via comparing the iris features of the testee with the features stored in the database.

In the conventional technology, massive iris feature data are stored in the database to improve the accuracy of iris identification, and it indeed puts a heavy burden on the system. Accordingly, the present invention proposes an iris recognition method, which utilizes a matching pursuit algorithm to simplify the extraction and reconstruction of iris features and reduce the memory space required by each piece of iris feature data without the penalty of recognition accuracy.

SUMMARY OF THE INVENTION

The primary objective of the present invention is to provide an iris recognition method, which utilizes a matching pursuit algorithm to simplify the extraction and reconstruction of iris features and reduce the memory space occupied by each piece of iris data without the penalty of recognition accuracy.

The iris recognition method of the present invention comprises: an iris localization component and a pattern matching component. In the iris localization component, the Hough Transform is used to locate the region of an iris. As the iris is paler than the pupil and darker than the sclera, a color discrimination method is used to locate the region of the iris. Next, the image of the iris is transformed into an ordinary two-dimensional picture via a software. Next, a matching pursuit algorithm is used to extract the primary features from the iris image and obtain a series of feature vectors. The feature vector is expressed by a sequence of atoms, and each atom contains the information of base, amplitude and location. Thereby, only the most significant iris features are retained, and unnecessary information is excluded, and the memory space occupied by each piece of iris data is thus reduced. Then, the comparison between the feature vectors of two irises is performed to determine whether they match, and the similarity between these two irises can be calculated from the inner product of the two feature vectors of these two irises.

To enable the objectives, technical contents, characteristics and accomplishments of the present invention to be easily understood, the embodiments of the present invention are to be described in detail in cooperation with the attached drawings below.

DETAILED DESCRIPTION OF THE INVENTION

The present invention pertains to an iris recognition method, which utilizes a matching pursuit algorithm to simplify the extraction and reconstruction of iris features and reduce the memory space occupied by each piece of iris data without the penalty of recognition accuracy.

Figure 1:
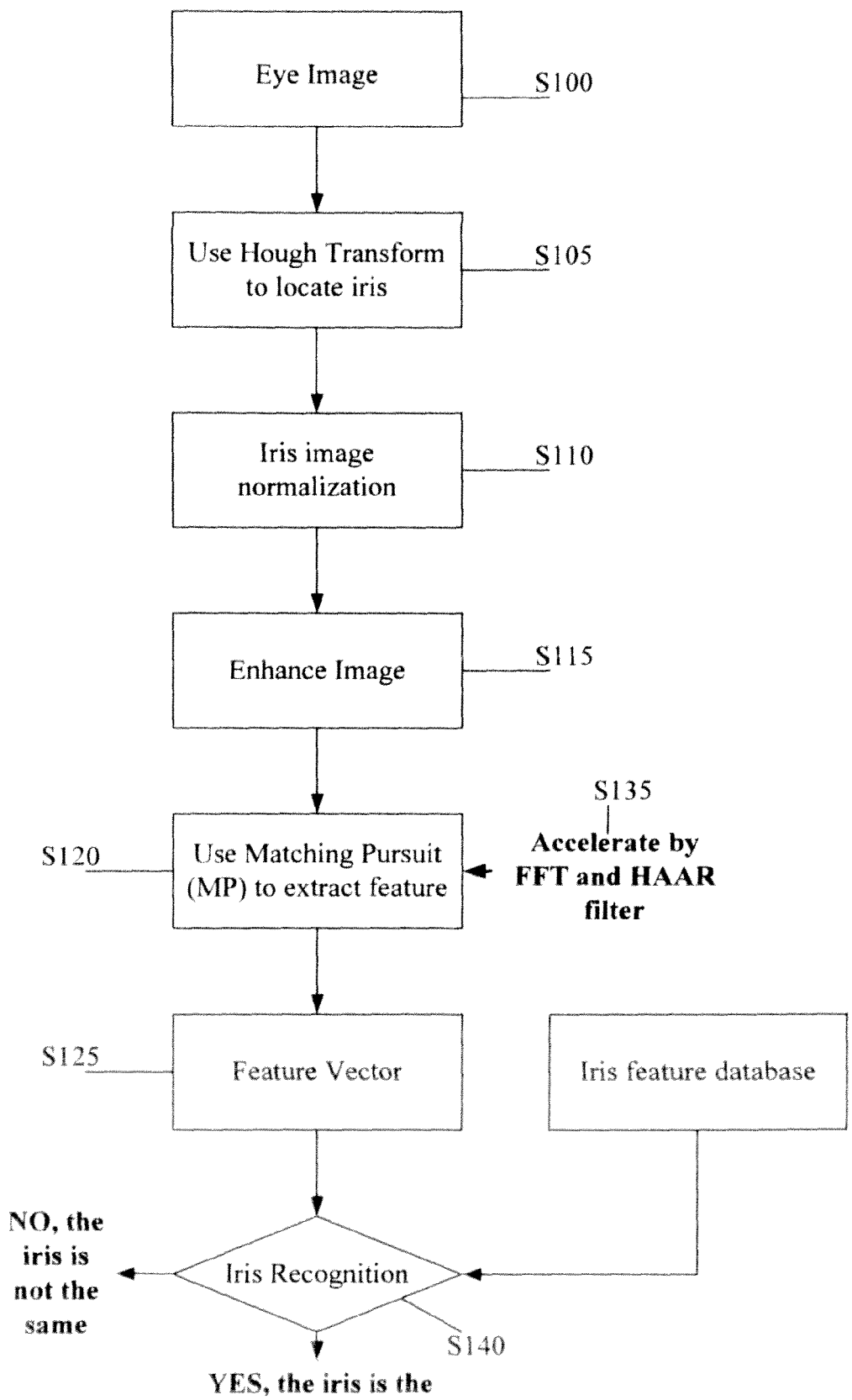
FIG. 1 is a block diagram showing the flowchart of the method of the present invention.
Figure 2:
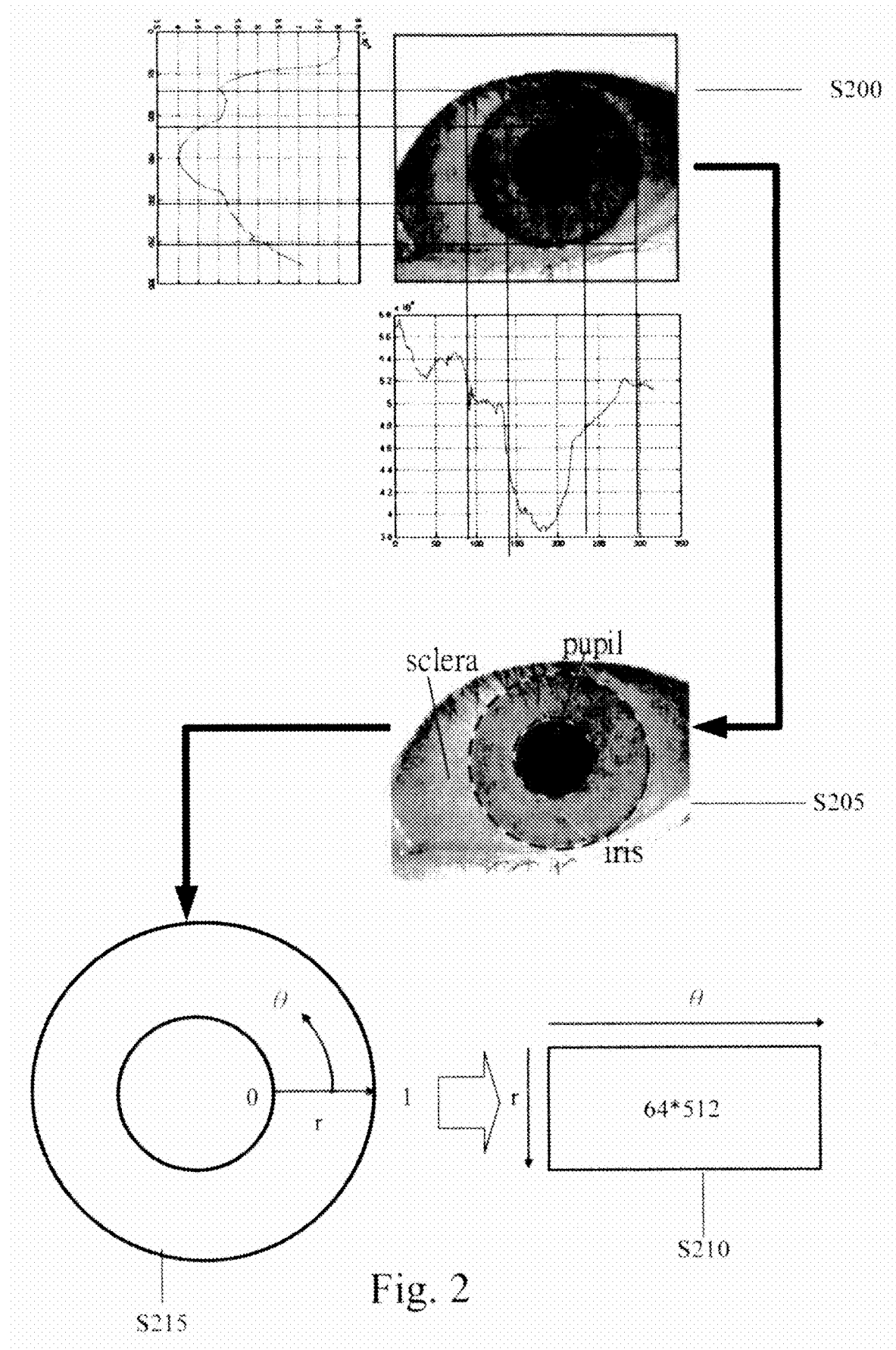
FIG. 2 is a diagram schematically showing the Hough Transform process according to the present invention.

Refer to FIG. 1 a block diagram showing the flowchart of the method of the present invention. In Step S100, an image containing the iris is obtained. Next, in Step S105, the iris region is located, and the located iris region is expanded into a rectangular image. Refer to FIG. 2 a diagram schematically showing that the iris region is located via the Hough Transform. In Step S200 shown in FIG. 2, based on the characteristic that the iris is paler than the pupil and darker than the sclera, a color discrimination method is used to locate the boundary between the iris and the pupil and the boundary between the iris and the sclera as shown in Step S205, and the centers and radii and the pupil and the iris can thus be defined according to the boundaries, and the region of the iris is then defined. In Step S215 shown in FIG. 2, the polar coordinate system is used to coordinatize the iris region. In Step S210 shown in FIG. 2, the iris region is unwrapped into a rectangular two-dimensional 64*512 picture with a software. As the iris is apt to be covered by the eyelid or the eyelashes, only the near-pupil inner part of the iris region is used in the present invention, and the picture is reduced to be 32*512. Refer to FIG. 1. In Step S110, the picture is normalized and intensified with a histogram equalization method. Next, in Step S115, the structural features are further enhanced with a high pass filter.

In an iris image, the information density is higher in the horizontal direction that in the vertical direction. Only processing the horizontal information is enough to obtain highly unique features, and very detailed vertical information is not used in the present invention so that system source can be saved and calculation can be reduced. Next, in Step S120, a matching pursuit algorithm is used to extract the primary structural features from the signals of the iris image.

The matching pursuit algorithm, which was proposed by Mallat and Zhang in 1993, utilizes non-linear procedures iteratively to decompose signals and obtain the linear expansion of a waveform. The matching pursuit algorithm is flexible for different objects and can find out the linear combination of wavelets, which is the closet to the object, from the database with an iterative method. As mentioned above, the iris features can be regarded as structural signals. Thus, the matching pursuit algorithm can be used to describe the most significant features of the structural signals. In Step S125, a series of vectors retaining the primary features of the original iris image is constructed.

The first step is to approximate f by projecting it on a vector $g_{\gamma_0} \in D$, and $g_{\gamma_0}$ and the inner product value $\langle f, g_{\gamma_0} \rangle$ are called an atom.

$$f = \langle f, g_{\gamma_0} \rangle g_{\gamma_0} + Rf \quad (1)$$

Since the residue $Rf$ is orthogonal to $g_{\gamma_0}$, $$\|f\|^2 = |\langle f, g_{\gamma_0} \rangle|^2 + \|Rf\|^2 \quad (2)$$

$\|Rf\|$ is minimized by choosing $g_{\gamma_0}$, which maximizes $|\langle f, g_{\gamma_0} \rangle|$. We choose $g_{\gamma_0}$ so that $$|\langle f, g_{\gamma_0} \rangle| = \sup_{\gamma \in \Gamma} |\langle f, g_{\gamma} \rangle| \quad (3)$$

The matching pursuit algorithm iterates this procedure by sub-decomposing the residue. Let $R^0 f = f$, and suppose that the residue $R^k f$ has been worked out. When $g_{\gamma_k} \in D$ has been chosen, $$|\langle R^k f, g_{\gamma_k} \rangle| = \sup_{\gamma \in \Gamma} |\langle R^k f, g_{\gamma} \rangle| \quad (4)$$

Project $R^k f$ on $g_{\gamma_k}$, and then $$R^{k+1} f = R^k f - \langle R^k f, g_{\gamma_k} \rangle g_{\gamma_k}, \quad (5)$$

which defines the residue at the order k+1. The orthogonality of $R^{k+1} f$ and $g_{\gamma_k}$ implies $$\|R^{k+1} f\|^2 = \|R^k f\|^2 - |\langle R^k f, g_{\gamma_k} \rangle|^2 \quad (6)$$

By summing (5) for k between 0 and n−1, the following equation is obtained:

$$f = \sum_{k=0}^{n-1} \langle R^k f, g_{\gamma_k} \rangle g_{\gamma_k} + R^n f \quad (7)$$

Similarly, summing (6) for k between 0 and n−1 yields $$\|f\|^2 = \sum_{k=0}^{n-1} |\langle R^k f, g_{\gamma_k} \rangle|^2 + \|R^n f\|^2 \quad (8)$$

The residue $R^n f$ is the approximation error of f after choosing n vectors in the dictionary. In infinite dimensional spaces, the convergence of the error to zero is shown to be $$\lim_{m \to \infty} \|R^m f\| = 0 \quad (9)$$

Hence $$f = \sum_{n=0}^{+\infty} \langle R^n f, g_{\gamma_n} \rangle g_{\gamma_n}, \quad (10)$$

and the following energy conversation equation is obtained:

$$\|f\|^2 = \sum_{n=0}^{+\infty} |\langle R^n f, g_{\gamma_n} \rangle|^2 \quad (11)$$

Image decompositions in the families of Gabor functions characterize the local scale orientation and phase of the image variations. Since the vertical information is not important, only the low pass filter dictionary is applied to the vertical direction. However, the Gabor filter is applied to the horizontal direction. In the present invention, the 2D wavelet dictionary is composed of these two kinds of filters.

The 1-D separation Gabor functions may be defined as a series of scaled and modulated Gaussian windows:

$$g_\alpha(i) = K_\alpha \cdot g\left(\frac{i - \frac{N}{2} + 1}{s}\right) \cdot \cos\left(\frac{2\pi\xi\left(i - \frac{N}{2} + 1\right)}{16} + \phi\right), \quad (12)$$

wherein g(t) is a prototypical Gaussian window, and $$g(t) = \{\text{fourth root}\}\sqrt{2}e^{-\pi t} \quad (13)$$

In Equation (12), $\vec{\alpha} = (s, \xi, \phi)$ includes: a positive ratio, a modulation frequency and a phase shift. The range of the 1-D Gabor dictionary is shown in Table 1.

TABLE 1

| k | $s_k$ | $\xi_k$ | $\phi_k$ |
|---|---|---|---|
| 0 | 1.0 | 0.0 | 0 |
| 1 | 3.0 | 0.0 | 0 |
| 2 | 5.0 | 0.0 | 0 |
| 3 | 7.0 | 0.0 | 0 |
| 4 | 9.0 | 0.0 | 0 |
| 5 | 12.0 | 0.0 | 0 |
| 6 | 14.0 | 0.0 | 0 |
| 7 | 17.0 | 0.0 | 0 |
| 8 | 20.0 | 0.0 | 0 |
| 9 | 1.4 | 1.0 | p/2 |
| 10 | 5.0 | 1.0 | p/2 |
| 11 | 12.0 | 1.0 | p/2 |
| 12 | 16.0 | 1.0 | p/2 |
| 13 | 20.0 | 1.0 | p/2 |
| 14 | 4.0 | 2.0 | 0 |
| 15 | 4.0 | 3.0 | 0 |
| 16 | 8.0 | 3.0 | 0 |
| 17 | 4.0 | 4.0 | 0 |
| 18 | 4.0 | 2.0 | p/4 |
| 19 | 4.0 | 4.0 | p/4 |

If we consider B to be the set of all such triples $\vec{a}$, the 2-D separable Gabor low pass functions may be defined as:

$$GL(i,j) = g_{\vec{a}}(i) \cdot lp(j), \vec{a} \in B \quad (14)$$

wherein lp is the function of the low pass filter; $i \in \{0, 1, \ldots, N-1\}$, and $j \in \{0, 1, \ldots, 3\}$.

Figure 3:
FIG. 3 is a diagram schematically showing the visualized 2-D Garbor basis.
Figure 4:
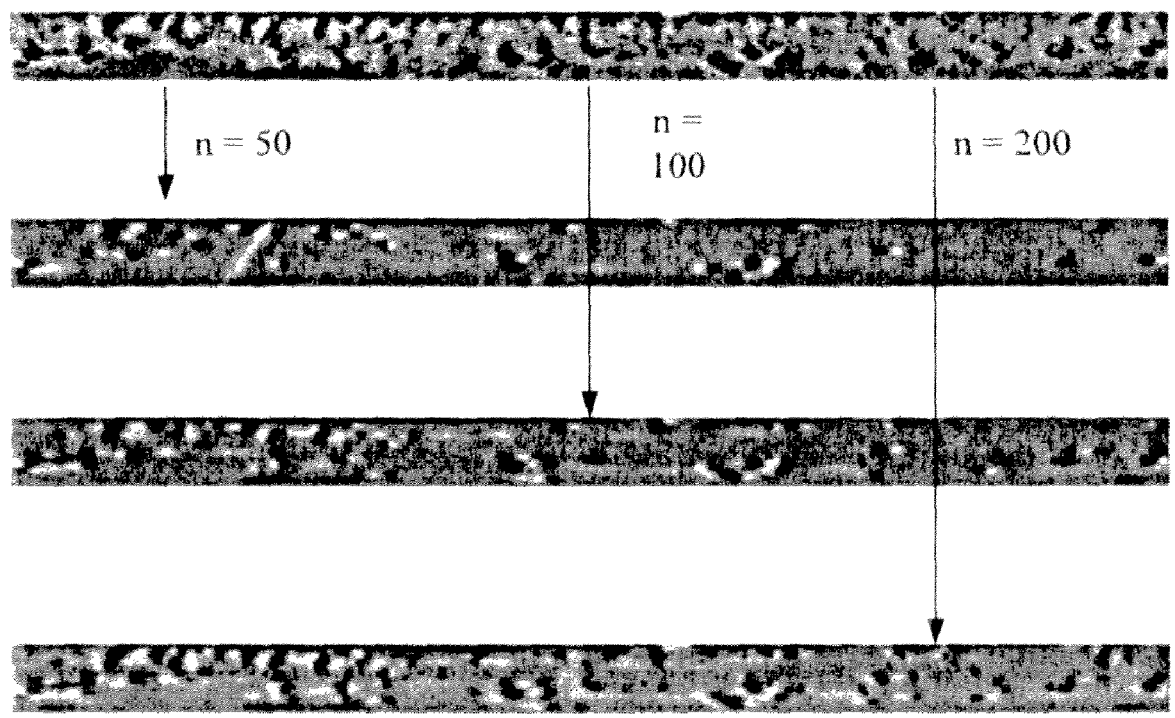
FIG. 4 is a diagram schematically showing the features obtained via n-fold iteration of the matching pursuit algorithm.

The database should be as small as possible, because a massive database decelerates algorithm operation. In our experiments, the database is successfully downscaled via applying only four low pass filters to the vertical direction. The visualized 2-D Garbor basis is shown in FIG. 3.

In Step S135 shown in FIG. 1, the low pass filter applying to the vertical direction can be implemented with the Haar filter having one-dimensional signals. By using the FFT algorithm to calculate DFT, the convolution via the frequency domain can be faster than directly convolving the time domain signals. The total cost for the direct convolution of two N-point sequences is $O(N^2)$, and the total cost for the convolution using the FFT algorithm is $O(N \log N)$, and there is an obvious difference between them.

The aim of the calculation is not to reconstruct the iris image as in detail as possible but to extract the main features from the iris information. An iris image can be represented by Equation (7) after n iterations based on the matching pursuit algorithm. The feature $f_r$ can be expressed by $$f_r = \sum_{k=0}^{n-1} \langle R^k f, g_{\gamma_k} \rangle g_{\gamma_k}, \quad (15)$$

which is the major part of Equation (7).

The recognition rate can be adjusted by changing the value of the parameter n. A smaller n leads to a smaller feature vector $f_r$ containing less features and thus decreases recognition accuracy. A larger n implies a higher recognition rate; however, it takes more computational cost. To achieve the compromise between validity and speed, an n equal to 200 is chosen in the experiment.

In Step S140, whether two irises match is determined, and it can be achieved with the similarity between these two irises, which is obtained by performing the comparison between the corresponding feature vectors. The similarity between two irises is obtained from the inner product operation of the corresponding feature vectors. In the embodiment, 200 atoms are decomposed, and each atom contains base, amplitude and location. If some atoms of two iris images overlap, the iris images have some correlation. The similarity between two iris images $f_1$ and $f_2$ is calculated from the following equation:

$$\langle f_{r_1}, f_{r_2} \rangle = \left\langle \left( \sum_{k=0}^{n-1} \langle R^k f_1, g_{\gamma_k} \rangle g_{\gamma_k} \right), \left( \sum_{l=0}^{n-1} \langle R^l f_2, g_{\gamma_l} \rangle g_{\gamma_l} \right) \right\rangle \quad (16)$$

wherein either of $f_{r_1}$ and $f_{r_2}$ is the feature vector containing 200 atoms. Herein, $a_k$ and $a_l$ respectively replace $\langle R^k f_1, g_{\gamma_k} \rangle$ and $\langle R^l f_2, g_{\gamma_l} \rangle$. Because k and l are independent, the following equation is obtained:

$$\langle f_{r_1}, f_{r_2} \rangle = \sum_{k=0}^{n-1} \sum_{l=0}^{n-1} \alpha_k \alpha_l \langle g_{\gamma_k}, g_{\gamma_l} \rangle \quad (17)$$

After normalizing Equation (16), $$\text{Similarity} = \frac{1}{\text{norm}_{f_{r_1}} \cdot \text{norm}_{f_{r_2}}} \sum_{k=0}^{n-1} \sum_{l=0}^{n-1} \alpha_k \alpha_l \langle g_{\gamma_k}, g_{\gamma_l} \rangle, \quad (18)$$

wherein $\text{norm}_{f_{r_i}}$ is defined to be $$\text{norm}_{f_{r_i}} = \sqrt{\sum_{k=0}^{n-1} |\langle R^k f_i, g_{\gamma_k} \rangle|^2} \quad (19)$$

Because the aim of the calculation is not to reconstruct images, it is not necessary that $f_{r_i}$ equal to fi (equal to 1). Therefore, a normalization operation is needed. The values of $a_k$ and $a_l$ have been already calculated during the feature extraction. Hence, we only need to compute $\text{norm}_{f_{r_i}}$ and $\langle g_{\gamma_k}, g_{\gamma_l} \rangle$. Since $g_{\gamma_k}$ and $g_{\gamma_l}$ belong to a fixed dictionary, all possible $\langle g_{\gamma_k}, g_{\gamma_l} \rangle$ values can be calculated and saved in a table. Thereby, it is unnecessary to calculate the inner product once more, and a lot of time is saved.

When an iris image is identified, only the primary fifty atoms are extracted form the iris image and compared with the iris database. Then, the most similar fifty pieces of iris data are selected from the iris database. Next, the quantity of the atoms extracted from the iris image is increased to 200, and the 200 atoms are compared with the selected fifty pieces of iris data. Thereby, the most matching iris can be found out from the selected fifty pieces of iris data. Such a method can exclude most of the dissimilar iris at the beginning and save the processing time.

In iris identification, the image rotation, such as that caused by the head's movement during capturing the iris image, brings about the variation of the captured image. In the present invention, a method like Daugman compulsive search system is used to solve the problem.

Those described above are the preferred embodiments to exemplify the present invention. However, it is not intended to limit the scope of the present invention. Any equivalent modification and variation according to the shapes, structures, characteristics and spirit stated in the claims of the present invention is to be also included within the scope of the claims of the present invention.

What is claimed is:

1. An iris recognition method, comprising:
an image acquiring component, operable to acquire an eye image;
an iris localization processor, said iris localization processor operable to perform steps including:
a step of locating an iris region, wherein said iris region is separated from an eye image and then transformed into a 2D rectangular image;
a step of iris feature extraction, wherein a plurality of feature points are extracted from said 2D rectangular image and transformed into a sequence of vectors; and
a pattern matching processor, said pattern matching processor operable to perform steps including:
a step of iris feature comparison, wherein said iris feature comparison is performed to estimate the similarity between said sequence of vectors of two irises and determine whether said two irises match;
wherein in said step of iris feature comparison, an equation $$\langle f_{r_1}, f_{r_2} \rangle = \sum_{k=0}^{n-1} \sum_{l=0}^{n-1} \alpha_k \alpha_l \langle g_{\gamma_k}, g_{\gamma_l} \rangle,$$

where:
$f_{r_1}$, $f_{r_2}$=feature vector,
$\langle R^k f, g_{\gamma_k} \rangle$, $g_{\gamma_k}$=atom,
$\alpha_k, \alpha_l$=amplitude,
$g_{\gamma_k}$, $g_\gamma$=base,
is used to calculate an inner product function of iris feature vectors and determine the similarity between two corresponding irises.

2. The iris recognition method according to claim 1, wherein in said step of locating an iris region, the Hough Transform is used to obtain said iris region.

3. The iris recognition method according to claim 1, wherein in said step of locating an iris region, said iris region is transformed into said rectangular image via the polar coordinate system.

4. The iris recognition method according to claim 1, wherein in said step of iris feature extraction, a matching pursuant algorithm is used to transform the plurality of feature points of an iris image into a series of feature vectors.

5. The iris recognition method according to claim 4, wherein said feature vector further comprises a sequence of atoms.

6. The iris recognition method according to claim 5, wherein said sequence of atoms contains an information of base, amplitude and location.

7. The iris recognition method according to claim 4, wherein in said matching pursuit algorithm, four low pass filters are used in the vertical direction of said iris image.

8. The iris recognition method according to claim 4, wherein in said matching pursuant algorithm, Gabor filters are used in the horizontal direction of said iris image.

9. The iris recognition method according to claim 1, wherein in said step of iris feature comparison, the comparison between feature vectors of said two corresponding irises is performed to determine whether said corresponding two irises match.

10. The iris recognition method according to claim 1, wherein the recognition accuracy can be adjusted via changing the value of the parameter n in said equation.

* * * * *